United States Patent
Kim et al.

(10) Patent No.: US 12,360,740 B2
(45) Date of Patent: Jul. 15, 2025

(54) NEURAL NETWORK DEVICE FOR NEURAL NETWORK OPERATION, METHOD OF OPERATING NEURAL NETWORK DEVICE, AND APPLICATION PROCESSOR INCLUDING NEURAL NETWORK DEVICE

(71) Applicant: Samsung Electronics Co., Ltd., Suwon-si (KR)

(72) Inventors: Hyunpil Kim, Seoul (KR); Seongwoo Ahn, Yongin-si (KR); Jonghyup Lee, Hwaseong-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 1108 days.

(21) Appl. No.: 17/223,324

(22) Filed: Apr. 6, 2021

(65) Prior Publication Data
US 2021/0312269 A1    Oct. 7, 2021

(30) Foreign Application Priority Data

Apr. 7, 2020 (KR) .................. 10-2020-0042410
Dec. 24, 2020 (KR) .................. 10-2020-0183519

(51) Int. Cl.
*G06F 5/01* (2006.01)
*G06F 7/544* (2006.01)
*G06F 17/16* (2006.01)

(52) U.S. Cl.
CPC ............ *G06F 5/012* (2013.01); *G06F 7/5443* (2013.01); *G06F 17/16* (2013.01); *G06F 2207/4824* (2013.01)

(58) Field of Classification Search
CPC .... G06F 7/49936; G06F 7/5443; G06F 17/16; G06F 5/012; G06F 2207/4824
See application file for complete search history.

(56) References Cited

U.S. PATENT DOCUMENTS

| | | |
|---|---|---|
| 7,130,977 B1 | 10/2006 | Christie et al. |
| 9,959,093 B2 | 5/2018 | Klein et al. |
| 10,474,458 B2 | 11/2019 | Kaul et al. |
| 10,528,321 B2 | 1/2020 | Bittner et al. |
| 2018/0336165 A1 | 11/2018 | Phelps et al. |

(Continued)

OTHER PUBLICATIONS

Roldao Lopes, Antonio, and George A. Constantinides. "A fused hybrid floating-point and fixed-point dot-product for FPGAs." In International symposium on applied reconfigurable computing, pp. 157-168. Berlin, Heidelberg: Springer Berlin Heidelberg, 2010. (Year: 2010).*

(Continued)

*Primary Examiner* — Matthew D Sandifer
(74) *Attorney, Agent, or Firm* — Harness, Dickey & Pierce, P.L.C.

(57) ABSTRACT

A neural network device for performing a neural network operation includes a floating point arithmetic circuit configured to perform a dot-product operation for each of a plurality of floating point data pairs, wherein the floating point arithmetic circuit is configured to, in the dot-product operation, align-shift a plurality of fraction part multiplying operation results respectively corresponding to the floating point data pairs based on a maximum value determined from a plurality of exponent part adding operation results respectively corresponding to the floating point data pairs.

20 Claims, 14 Drawing Sheets

(56) References Cited

U.S. PATENT DOCUMENTS

| | | |
|---|---|---|
| 2019/0122106 A1 | 4/2019 | Lee et al. |
| 2019/0164043 A1 | 5/2019 | Litvak et al. |
| 2019/0294415 A1* | 9/2019 | Kaul .................... G06F 7/4876 |
| 2019/0340489 A1 | 11/2019 | Mills |
| 2020/0026494 A1 | 1/2020 | Langhammer et al. |
| 2020/0089472 A1 | 3/2020 | Pareek et al. |
| 2021/0132905 A1* | 5/2021 | Ware .................... G06F 7/5443 |
| 2021/0263993 A1* | 8/2021 | Urbanski ............... G06F 7/5443 |
| 2021/0311703 A1* | 10/2021 | Kim ........................ G06N 3/063 |
| 2021/0312012 A1* | 10/2021 | Kim ........................ G06F 7/22 |
| 2022/0236949 A1* | 7/2022 | Song .................. G06F 7/49915 |

OTHER PUBLICATIONS

Saleh, Hani, et al. "A floating-point fused Dot-product unit," DOI: 10.1109/ICCD.2008.4751896, IEEE Xplore, pp. 427-431 (2008).

* cited by examiner

<Floating Point Format 1>

<Floating Point Format 2>

<Floating Point Format 3>

<Integer Format>

FIG. 7B

Case1 { 
IN_A(FP) : | Sa | Exponent A (Ea) | Fraction A (Fa) |
IN_B(FP) : | Sb | Exponent B (Eb) | Fraction B (Fb) |
}

Case2 {
IN_A(FP) : | Sa | Exponent A (Ea) | Fraction A (Fa) |
IN_B(BF) : | Sb | Exponent B (Eb) | Fraction B (Fb) |
}

Case3 {
IN_A(BF) : | Sa | Exponent A (Ea) | Fraction A (Fa) |
IN_B(BF) : | Sb | Exponent B (Eb) | Fraction B (Fb) |
}

NEURAL NETWORK DEVICE FOR NEURAL NETWORK OPERATION, METHOD OF OPERATING NEURAL NETWORK DEVICE, AND APPLICATION PROCESSOR INCLUDING NEURAL NETWORK DEVICE

CROSS-REFERENCE TO RELATED APPLICATIONS

This application is based on and claims priority under 35 U.S.C. § 119 to Korean Patent Application Nos. 10-2020-0042410, filed on Apr. 7, 2020 and 10-2020-0183519, filed on Dec. 24, 2020, in the Korean Intellectual Property Office, the disclosures of each of which are incorporated by reference herein in their entirety.

BACKGROUND

Inventive concepts relates to a neural network, and more particularly, a neural network device including a floating point arithmetic circuit and/or a floating point arithmetic method thereof.

A neural network may refer to a computational architecture that models biological networks corresponding to the brains of animals. With the recent development of neural network technology, research into analyzing input data and/or extracting valid information using neural network devices operating based on neural networks in various types of electronic systems is being actively conducted.

A neural network device needs a large amount of operations for complex input data. For a neural network device to analyze an input in real time and to extract information, a technology capable of efficiently processing operations of a neural network is needed. In particular, because a low-power high-performance system like a smartphone has limited resources, there is a need for a technology capable of improving, e.g. of maximizing the performance of an artificial neural network while reducing the amount of operations required to process complex input data.

SUMMARY

Inventive concepts provide a neural network device including a floating point arithmetic circuit and/or a floating point arithmetic method thereof.

According to some example embodiments of inventive concepts, there is provided a neural network device including processing circuitry configured to perform a dot-product operation for each of a plurality of floating point data pairs. The processing circuitry is configured to perform the dot-product operation by align-shifting a plurality of fraction part multiplying operation results respectively corresponding to the floating point data pairs, the align-shifting based on a first value determined from a plurality of exponent part adding operation results respectively corresponding to the floating point data pairs.

According to some example embodiments of inventive concepts, there is provided a method of operating a neural network device, the method including receiving a plurality of floating point data pairs from a memory, and performing a dot-product operation for each of the plurality of floating point data pairs. The performing of the dot-product operation includes performing exponent part adding operations for each of the plurality of floating point data pairs, performing fraction part multiplying operations on the each of the plurality of floating point data pairs, determining a first value from the exponent part adding operation results respectively corresponding to the each of the plurality of floating point data pairs, and align-shifting the fraction part multiplying operation results respectively corresponding to the each of the plurality of floating point data pairs based on the first value.

According to some example embodiments of inventive concepts, there is provided an application processor including a neural network device configured to perform a dot-product operation for each of a plurality of floating point data pairs, the floating point data pairs including operation parameters and feature values. The neural network device is configured to perform the dot-product operation by collectively align-shifting and summing a plurality of fraction part multiplying operation results corresponding to the floating point data pairs, the align-shifting and summing based on a plurality of exponent part adding operation results respectively corresponding to the floating point data pairs.

BRIEF DESCRIPTION OF THE DRAWINGS

Some non-limiting example embodiments of inventive concepts will be more clearly understood from the following detailed description taken in conjunction with the accompanying drawings in which:

FIG. 7B is a diagram for describing types of formats of floating point data pairs input to a floating point arithmetic circuit;

DETAILED DESCRIPTION OF EXAMPLE EMBODIMENTS

Figure 1:
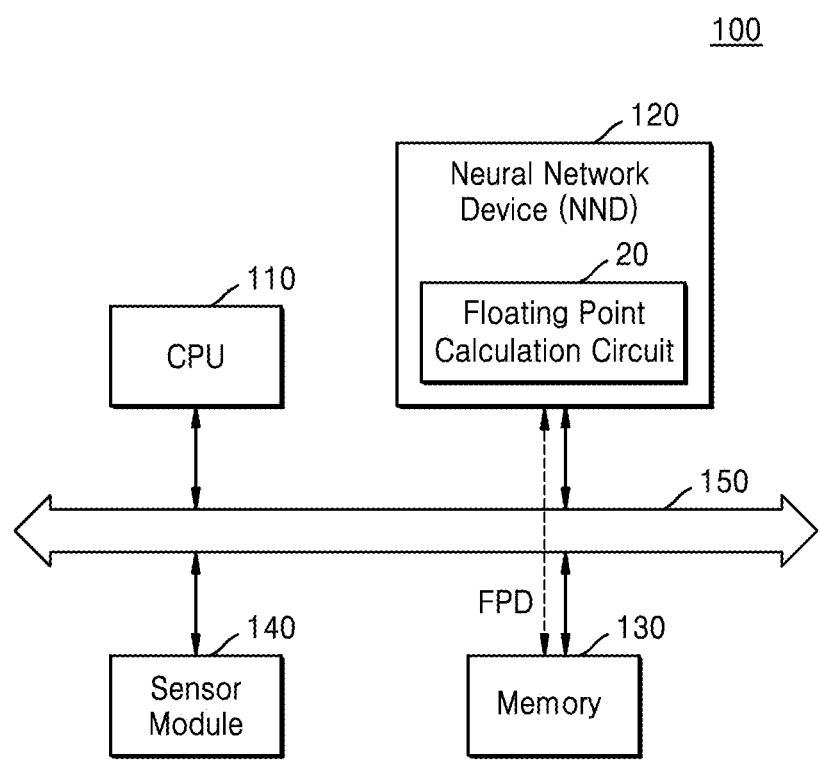
FIG. 1 is a schematic block diagram showing a neural network system according some example embodiments of inventive concepts.

FIG. 1 is a schematic block diagram showing a neural network system 100 according some example embodiments of inventive concepts.

The neural network system 100 may train and/or learn a neural network, and/or may infer information included in input data by analyzing the input data using a neural network. The neural network system 100 may determine a situation and/or may control components of an electronic device in which the neural network system 100 is mounted, based on inferred information. For example, the neural network system 100 may be applied to at least one of a smartphone, a tablet device, a smart TV, an Augmented Reality (AR) device, an Internet of Things (IoT) device, an autonomous driving vehicle, a robot, a medical device, a drone, an advanced driver assistance systems (ADAS), an image display device, a measurement device, etc. that perform voice recognition, image recognition, and image classification using neural networks, and the neural network system 100 may also be mounted in various types of electronic devices. In some example embodiment, the neural network system 100 of FIG. 1 may be or include an application processor.

Referring to FIG. 1, the neural network system 100 may include a central processing unit (CPU) 110, a neural network device 120, a memory 130, and a sensor module 140. The neural network system 100 may further include an input/output module, a security module, and a power controller, and may further include various types of processors. In some embodiments, some or all of the components of the neural network system 100 (e.g., the CPU 110, the neural network device 120, the memory 130, and the sensor module 140) may be formed on a single chip. For example, the neural network system 100 may be implemented as a system-on-chip (SoC). The components of the neural network system 100 may communicate with one another through a bus 150. The bus 150 may be wired, and/or may be wireless. Although not shown in FIG. 1, the neural network system 100 may further include interfaces (not shown) for communicating with other Intellectual Property (IP) blocks.

The CPU 110 controls all operations of the neural network system 100. The CPU 110 may include a single core or multi-cores. The CPU 110 may process and/or execute programs and/or data stored in a storage region like the memory 130.

For example, the CPU 110 may control the neural network device 120 to execute an application and perform neural network-based tasks demanded as the application is executed. The neural network device 120 may include at least one of various types of neural network models like a convolution neural network (CNN), a region with convolution neural network (R-CNN), a region proposal network (RPN), a recurrent neural network (RNN), a stacking-based deep neural network (S-DNN), a state-space dynamic neural network (S-SDNN), a deconvolution network, a deep relief network (DBN), a restricted Boltzmann machine (RBM), a fully convolutional network, a long short-term memory (LSTM) network, and/or a classification network.

The neural network device 120 may perform a neural network operation based on received input data. The neural network device 120 may generate an information signal based on a result of performing a neural network operation. The neural network device 120 may be implemented as at least one of a neural network operation accelerator, a coprocessor, a digital signal processor (DSP), an application specific integrated circuit (ASIC), etc. In some example embodiments, the neural network device 120 may include at least one cluster consisting of or including a plurality of neural processing circuits.

In some example embodiments, the neural network device 120 may be applied in a machine learning system. The machine learning system may perform some operations (e.g., the operations described herein as being performed by the machine learning module) by artificial intelligence and/or machine learning. As an example, the neural network device 120 may implement an artificial neural network (e.g., the machine learning module) that is trained on a set of training data by, for example, a supervised, unsupervised, and/or reinforcement learning model, and wherein the processing circuitry may process a feature vector to provide output based upon the training. The machine learning model may utilize a variety of artificial neural network organizational and processing models, such as convolutional neural networks (CNN), deconvolutional neural networks, recurrent neural networks (RNN) optionally including long short-term memory (LSTM) units and/or gated recurrent units (GRU), stacked neural networks (SNN), state-space dynamic neural networks (SSDNN), deep belief networks (DBN), generative adversarial networks (GANs), and/or restricted Boltzmann machines (RBM).

Alternatively or additionally, such machine learning systems may include other forms of machine learning models, such as, for example, linear and/or logistic regression, statistical clustering, Bayesian classification, decision trees, dimensionality reduction such as principal component analysis, and expert systems; and/or combinations thereof, including ensembles such as random forests. Such machine learning models may also be used to provide various services and/or applications, e.g., an image classify service, a user authentication service based on bio-information or biometric data, an advanced driver assistance system (ADAS) service, a voice assistant service, an automatic speech recognition (ASR) service, or the like, may be performed, executed or processed by electronic devices.

Meanwhile, the neural network device 120 according some example embodiments of inventive concepts includes a floating point arithmetic circuit 20, and may perform a neural network operation based on a floating point operation. The floating point arithmetic circuit 20 may perform dot-product operations on a plurality of pieces of floating point data and may perform an operation for accumulating, e.g. summing, results of the dot-product operations. The floating point data may be divided into a plurality of floating point data pairs for dot-product operations and input to the floating point arithmetic circuit 20.

The neural network may include floating point data expressed as a real number, e.g., a floating point number. For example, the floating point data may include at least one of a feature map, a kernel (weight map), a bias, etc. By representing data as a floating point, the data may be expressed to be in a wide range of values and may be suitable for representing an approximation of a real number.

The floating point arithmetic circuit 20 according some example embodiments may support dot-product operations for floating point data having various types of formats. The floating point arithmetic circuit 20 may extend, e.g. may lengthen and/or append and/or add bits to, at least one of an exponent part bit region and a fraction part bit region of data, so as to comply with a pre-set bit width for collective dot-product operations of floating point data having different types of formats. As used herein, a fraction part may be or correspond to a significant part or a mantissa part of floating point data.

A shiftable bit width, e.g. a number of bits, of an align-shifter for a dot-product operation included in the floating point arithmetic circuit 20 according some example embodiments may be reduced to a degree that does not affect an operation accuracy demanded by the neural network system 100. Therefore, the size of the align-shifter may be reduced, power consumption may be reduced and/or minimized, and/or a dot-product operation speed may be improved. For example, in some example embodiments in which the operation accuracy demanded by the neural network system 100 is relatively high, the align-shifter of the floating point arithmetic circuit 20 may be designed to align data with a relatively large bit width. In contrast, in some example embodiments in which the operation accuracy demanded by the neural network system 100 is relatively low, the align-shifter of the floating point arithmetic circuit 20 may be designed to align data with a relatively small bit width.

In some example embodiments, in a dot-product operation for each of the floating point data pairs, the floating point arithmetic circuit 20 may align-shift results of a plurality of fraction part multiplying operations respectively corresponding to the floating point data pairs based on a value, e.g. a maximum value or near-maximum value, determined from results of a plurality of exponent part adding operations.

In some example embodiments, to generate output data corresponding to the results of the dot-product operations, the floating point arithmetic circuit 20 may collectively sum results of align-shifted fraction part multiplying operations and may normalize and round a result of the summation.

To perform the above-stated operation, the floating point arithmetic circuit 20 may include an align-shifter and an adder, which are smaller than existing or conventional ones. Furthermore, when performing a dot-product operation, the floating point arithmetic circuit 20 may be faster, may consume less power, and/or may reduce hardware resource usage.

The neural network device 120 may receive a plurality of pieces of floating point data FPD stored in the memory 130 as input data and may perform dot-product operations on the pieces of floating point data FPD by using the floating point arithmetic circuit 20. The neural network device 120 may accumulate results of a plurality of dot-product operations by using the floating point arithmetic circuit 20. Accumulated data may be stored in an internal buffer (not shown) of the neural network device 120.

The neural network device 120 may perform a neural network operation based on the floating point data FPD and may store a result of the neural network operation in the memory 130. Additionally or alternatively, the neural network device 120 may output the floating point data FPD, which is generated as a result of the neural network operation, as output data. In some example embodiments, a format type of input data input to the floating point arithmetic circuit 20 may be different from a format type of output data output from the floating point arithmetic circuit 20. For example, the input data may have a floating point 16 (FP16) type format and/or a brain float 16 (BF16) type format, and the output data may have a floating point 32 (FP32) type format. For example, '16' bit data may be input to the floating point arithmetic circuit 20, and '32' bit data may be output as a result of a dot product operation or an accumulation operation. However, inventive concepts are not limited thereto. The floating point arithmetic circuit 20 may receive data having a format of a first type according to a standard applied to the neural network system 100 and, after a dot-product operation and an accumulation operation, output data having a format of a second type.

The neural network device 120 may perform a dot-product operation and an accumulation operation on the floating point data FPD input from the memory 130 by using the floating point arithmetic circuit 20 and store floating point data FPD, which is a result of the dot-product operation and the accumulation operation, in the memory 130. In some example embodiments, the neural network device 120 may transmit and receive the floating point data FPD to and from the memory 130 through the bus 150 without an intervention of the CPU 110. For example, the floating point data FPD may be directly transmitted and received between the neural network device 120 and the memory 130.

The memory 130 may store programs and/or data used in the neural network system 100. The memory 130 may also store operation parameters for a neural network (e.g., at least one of weight values, bias values, etc.), parameters for quantization of a neural network (e.g., at least one of scale factors, bias values, etc.), input data (e.g., an input feature map), and output data (e.g., an output feature map). At least one of the operation parameters, the parameters for quantization, the input data, and the output data may be floating point data FPD.

The memory 130 may be or include, but is not limited to, dynamic random access memory (DRAM). The memory 130 may include at least one of a volatile memory and a non-volatile memory. The non-volatile memory includes at least one of read only memory (ROM), programmable ROM (PROM), electrically programmable ROM (ERPOM), electrically erasable and programmable ROM (EEPROM), flash memory, phase-change random access memory (PRAM), magnetic RAM (MRAM), resistive RAM (RRAM), ferroelectric RAM (FeRAM), etc. The volatile memory includes at least one of DRAM, static RAM (SRAM), synchronous DRAM (SDRAM), PRAM, MRAM, RRAM, FeRAM, etc. According to some example embodiments, the memory 130 may include at least one of a hard disk drive (HDD), a solid state drive (SSD), a compact flash (CF) card, a secure digital (SD) card, a micro secure digital (Micro-SD) card, a mini Secure digital (Mini-SD) card, an extreme digital (xD) card, and a memory stick.

The sensor module 140 may collect information around an electronic device on which the neural network system 100 is mounted. The sensor module 140 may sense and/or receive signals (e.g., an image signal, an audio signal, a magnetic signal, a biological signal, a touch signal, etc.) from outside of the electronic device and convert the sensed or received signal into sensing data. To this end, the sensor module 140 may include at least one of various types of sensing devices like a microphone, an imaging device, an image sensor, a light detection and ranging (LIDAR) sensor, an ultrasonic sensor, an infrared sensor, a bio sensor, and a touch sensor.

The sensing data may be provided as input data to the neural network device 120 or may be stored in the memory 130. The sensing data stored in the memory 130 may be provided to the neural network device 120. In some example embodiments, the neural network device 120 may further include a Graphics Processing Unit (GPU) for processing image data, and sensing data may be stored in the memory 130 or provided to the neural network device 120 after being processed by the GPU.

For example, the sensor module 140 may include an image sensor and may generate image data by capturing images of an external environment of an electronic device. Image data output from the sensor module 140 or image data processed by the GPU may be or include floating point data, and the image data may be provided, e.g. directly provided to the neural network device 20 or provided to the neural network device 20 after being stored in the memory 130. In some example embodiments, the neural network system 100 may further include a pre-processor that processes data input to the neural network device 120 and/or a post-processor that processes data output from the neural network device 120.

Meanwhile, in some example embodiments, the neural network system 100 of FIG. 1 may not include the sensor module 140 and may receive input data from a sensor module (not shown) separately provided through an interface.

Figure 2:
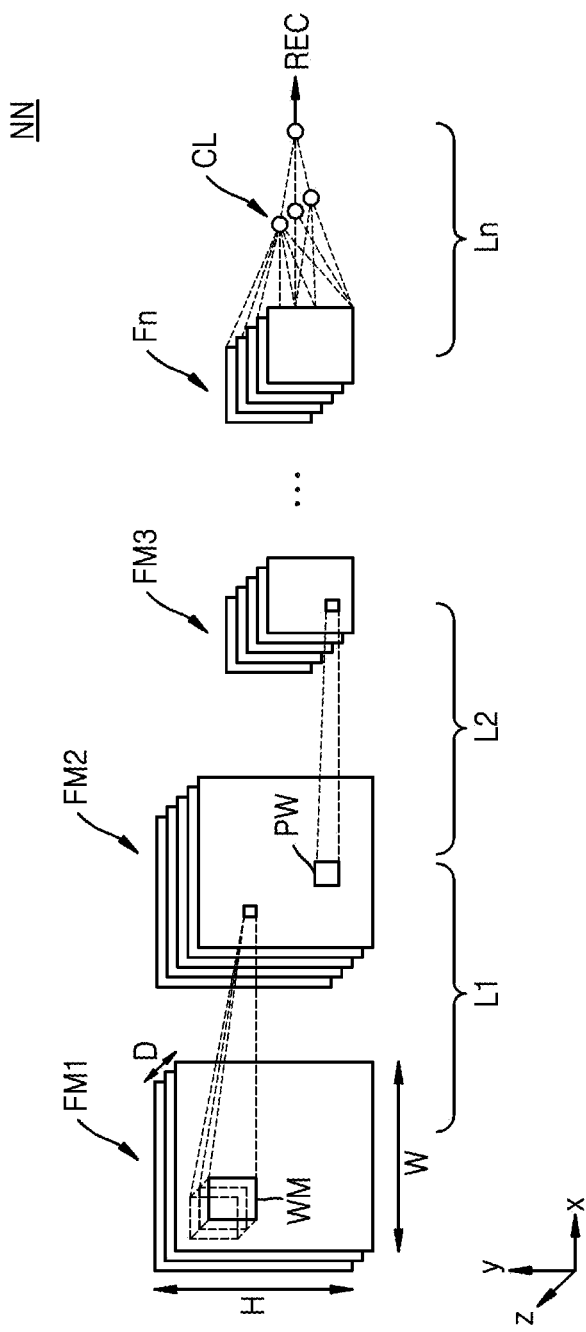
FIG. 2 is a diagram showing an example of a neural network structure.

FIG. 2 is a diagram showing an example of a neural network structure. Referring to FIG. 2, a neural network NN may include a plurality of layers L1 to Ln. The neural network of such a multi-layered structure may be referred to as a deep neural network (DNN) or a deep learning architecture. Each of the layers L1 to Ln may be or may include a linear layer and/or a non-linear layer, and, in some example embodiments, at least one linear layer and at least one non-linear layer may be combined with each other to be referred to as one layer. For example, a linear layer may include a convolution layer and a fully connected layer, and a non-linear layer may include a pooling layer and an activation layer.

For example, a first layer L1 may be or correspond to or include a convolution layer, a second layer L2 may be or correspond to or include a pooling layer, and an n-th layer Ln may be or correspond to or include, as an output layer, a fully connected layer. The neural network NN may further include an activation layer and may further include layers for performing other types of operations.

The layers L1 to Ln may each receive an input image frame or a feature map generated in a previous layer as an input feature map and may generate an output feature map or a recognition signal REC by processing the input feature map. Here, the feature map refers to data in which various characteristics of input data are expressed. Feature maps FM1, FM2, FM3, and FMn may each have, for example, a 2-dimensional matrix shape, or, alternatively, a 3-dimensional matrix shape including a plurality of feature values (or referred to as a tensor). The feature maps FM1, FM2, FM3, and FMn have a width W (or a column), a height H (or a row), and a depth D, which may respectively correspond to the x-axis, the y-axis, and the z-axis in a coordinate system. Here, the depth D may be referred to as the number of channels.

The first layer L1 may generate a second feature map FM2 by convoluting or convolving a first feature map FM1 with a weight map WM. The weight map WM may have a form of a 2-dimensional matrix or a 3-dimensional matrix and may include a plurality of weight values. The weight map WM may also be referred to as a kernel. The weight map WM may filter the first feature map FM1 and may be referred to as a filter or a kernel. A depth (e.g., the number of channels) of the weight map WM is the same as a depth (e.g., the number of channels) of the first feature map FM1, and the same channels of the weight map WM and the first feature map FM1 may be convoluted with each other. The weight map WM may be shifted in a manner of traversing the first input feature map FM1 as a sliding window. During each shift, each of weights included in the weight map WM may be multiplied by all feature values in a region overlapping the first feature map FM1 and summed. As the first feature map FM1 and the weight map WM are convoluted/convolved with each other, one channel of a second feature map FM2 may be generated. Although one weight map WM is shown in FIG. 2, as a plurality of weight maps are substantially (convoluted or convolved with the first feature map FM1, a plurality of channels of the second feature map FM2 may be generated. For example, the number of channels of the second feature map FM2 may correspond to the number of weight maps.

A second layer 12 may generate a third feature map FM3 by changing a spatial size of the second feature map FM2 through pooling. Pooling may be referred to as sampling or down-sampling. A 2-dimensional pooling window PW may be shifted on the second feature map FM2 by the size the pooling window PW as a unit, and a value such as the maximum value (or an average value) of feature values in a region overlapping the pooling window PM may be selected. Therefore, the third feature map FM3 having a changed spatial size may be generated from the second feature map FM2. The number of channels of the third feature map FM3 may be identical to the number of channels of the second feature map FM2.

An n-th layer Ln may classify classes CL of input data by combining features of an n-th feature map FMn. Also, recognition signals REC corresponding to respective classes may be generated. For example, when input data is image data and the neural network NN performs image recognition, the n-th layer Ln may recognize an object of an image indicated by the image data by extracting a class corresponding to the object based on the n-th feature map FMn provided from a previous layer and generate a recognition signal REC corresponding to the recognized object.

As described with reference to FIG. 2, the neural network NN may be implemented with a complex architecture, and a neural network device that performs a neural network operation may perform a very large number of operations ranging from hundreds of millions to tens of billions. However, in the neural network system 100 according some example embodiments of inventive concepts, as a shiftable bit width of an align-shifter may change to a degree that the neural network device 120 does not affect the accuracy of a final result, and power consumption and/or a circuit area of the neural network device 120 may be reduced, and/or the processing speed of the neural network device 120 may be improved.

Figure 3A:
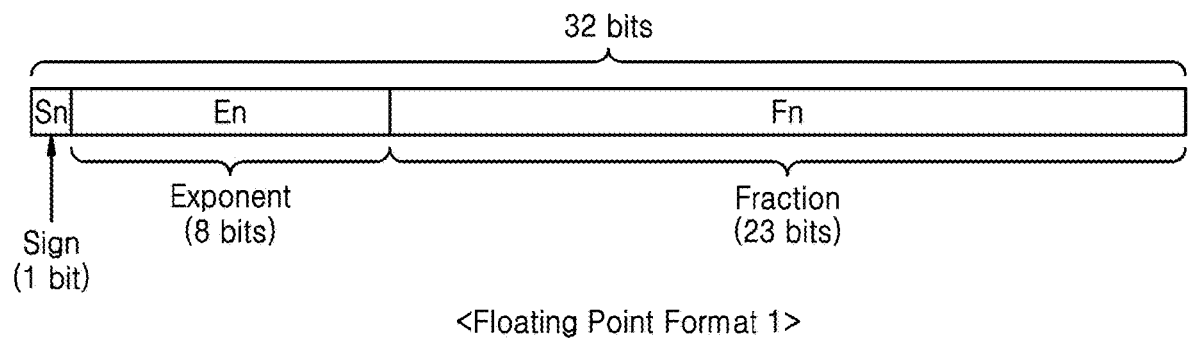
FIGS. 3A to 3C are diagrams for describing examples of types of floating point data formats.
Figure 3B:
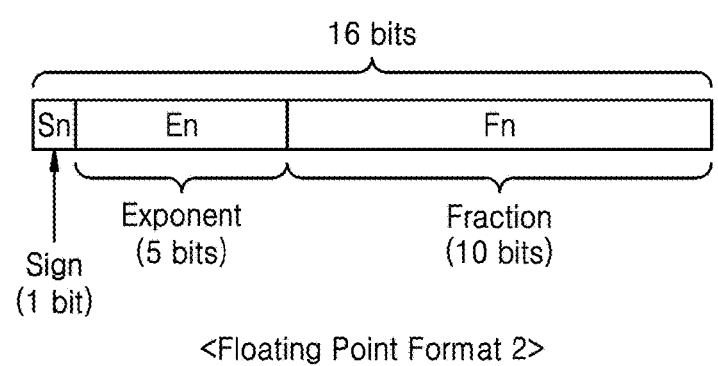
Figure 3C:
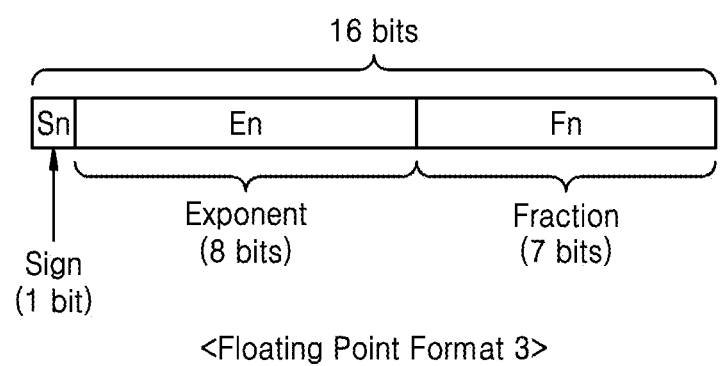
Figure 3D:
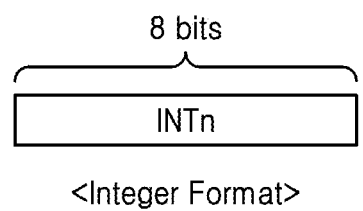
FIG. 3D is a diagram for describing an example of integer data.

FIGS. 3A to 3C are diagrams for describing examples of types of floating point data formats, and FIG. 3D is a diagram for describing an example of integer data.

Referring to FIG. 3A, floating point data may be expressed in the form of a sign along with $(+/-)a \times 2^b$, wherein "b" corresponds to an exponent part and "a" corresponds to a fraction part. According to the Institute of Electrical and Electronics Engineers (IEEE) 754-2008 standard, which is the IEEE standard for floating point operation, in 32-bit floating point data with a format of a first type, a single bit represents or stores a symbol such as a sign, '8' bits represent/store the exponent part (e.g. "b"), and '23' bits represent the fraction part (e.g. "a"). As shown in FIG. 3A, the most significant bit (MSB) may indicate a sign, '8' bits after the MSB may indicate the exponent part, and the remaining '23' bits may indicate the fraction part (or a fraction or a significant number). Hereinafter, floating point data having the format of the first type may be referred to as a floating point 32 (FP32).

Referring to FIG. 3B, according to the IEEE 754-2008 standard, in 16-bit floating point data with a format of a second type, a '1' bit represents/stores a sign, '5' bits represent/store the exponent part (e.g. "b"), and '10' bits represent/store the fraction part (e.g. "a"). For example, the '5' bits after the MSB may indicate the exponent part, and the remaining '10' bits may indicate the fraction part (or a fraction or a significant number). Hereinafter, floating point data having the format of the second type may be referred to as a floating point 16 (FP16).

Referring to FIG. 3C, in 16-bit floating point data with a format of a third type, a '1' bit represents/stores a sign, '8' bits represent/store the exponent part (e.g. "b"), and '7' bits represent/store the fraction part (e.g. "a"). For example, the '8' bits after the MSB may indicate the exponent part, and the remaining '7' bits may indicate the fraction part (or a fraction or a significant number). Hereinafter, floating point data having the format of the third type may be referred to as a brain float 16 (BF16).

Referring now to FIG. 3D, data in an integer format may be expressed in various types according to the presence of a sign and data sizes (numbers of bits). For example, an integer data generally used for a computing operation may be expressed as 8-bit data including a sign as shown in FIG. 3D, wherein, when the integer is a signed number, the MSB indicates the sign, the remaining 7 bits indicate an integer part INTn, and the size thereof is $$\sum_{0}^{6} INTn * 2^n - INT_7 * 2^7.$$

when the integer is an unsigned number, the integer is a positive number and has the size of $$\sum_{0}^{7} INTn * 2^n.$$

The integer data may be encoded in big-endian format. Additionally or alternatively, may be encoded in little-endian format.

The neural network device according to the example embodiment may receive floating point data corresponding to a format of at least one of first to third types and may perform a dot-product operation and an accumulation operation. For example, the neural network device may receive a plurality of pieces of floating point data corresponding to a format of at least one of, e.g. the same or different ones of, the FP16 type, the BF16 type, and the FP32 type, perform a dot-product operation, and may output output data having the format of the FP32 type. However, example embodiments are not limited thereto. The neural network device may receive floating point data of formats of more various types, may perform a dot-product operation and an accumulation operation, and may output output data having a predetermined format demanded by a neural network system.

Figure 4:
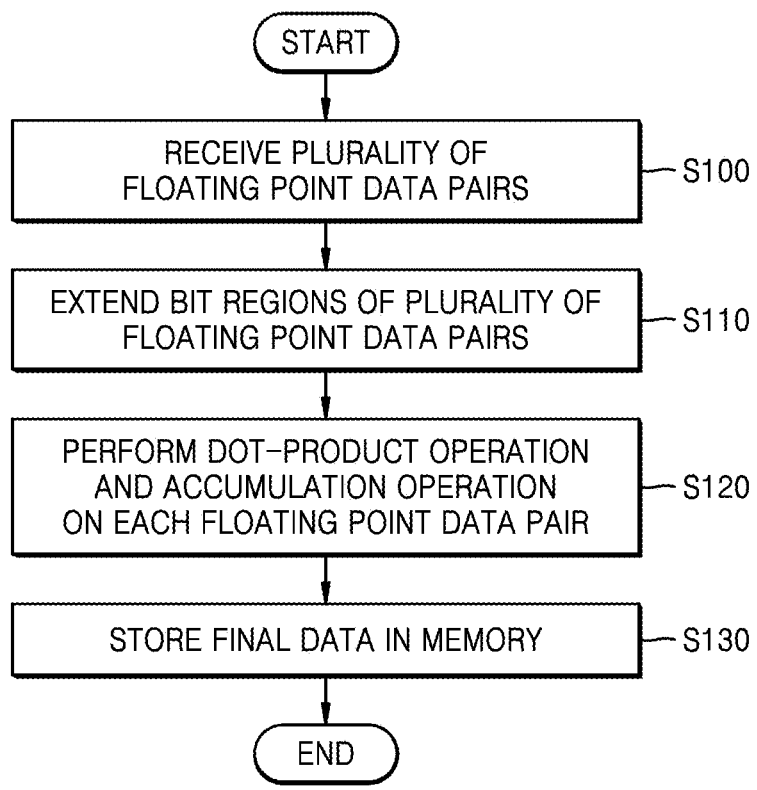
FIG. 4 is a flowchart of a method of operating a neural network device, according some example embodiments of inventive concepts.

FIG. 4 is a flowchart of a method of operating a neural network device according some example embodiments of inventive concepts. The method of FIG. 4 may be performed by a neural network device (120 of FIG. 1) for a neural network operation. For convenience of explanation, the method of FIG. 4 will be described with reference to FIG. 1 together.

Referring to FIG. 4, in operation S100, the neural network device 120 may receive a plurality of floating point data pairs from the memory 130, e.g. of two floating point numbers. The floating point data pairs may include at least one of input feature values, weight values, and coefficients of functions needed for a neural network operation. Also, when the neural network device 120 processes a quantized neural network, the floating point data pairs may include quantization parameters. For example, the quantization parameter may include at least one of a scale value (and/or an inverse scale value), a bias value, etc.

In operation S110, the neural network device 120 may extend or lengthen a bit region of each floating point data pair. The neural network device 120 may extend or lengthen at least one of an exponent part bit region and a fraction part bit region of data to comply with a specific, e.g. a pre-set bit width for collective dot-product operations of the floating point data pairs. Example embodiments thereof will be described later with reference to FIGS. 8A and 8B.

In operation S120, the neural network device 120 may perform a dot-product operation and an accumulation operation for each of the floating point data pairs. The neural network device 120 may perform an exponent part adding operation and a fraction part multiplying operation for floating point data pairs during the dot-product operation. The neural network device 120 may determine a value, such as a large value or the maximum value or a value corresponding to the maximum value, from results of the exponent part adding operations corresponding to the respective floating point data pairs during the dot-product operation. The neural network device 120 may align-shift results of the fraction part multiplying operation corresponding to the respective floating point data pairs based on the value, e.g. the maximum value, during the dot-product operation, and the align-shifted results of the fraction part multiplying operations may be collectively accumulated, e.g. summed up. Furthermore, the neural network device 120 may accumulate newly dot-product operated data to accumulated data stored in an internal buffer. Furthermore, in operation S120, the neural network device 120 may further perform a neural network operation including convolution, pooling, etc. other than a dot-product operation.

In operation S130, the neural network device 120 may store final data generated in operation S120 in the memory 130.

Figure 5:
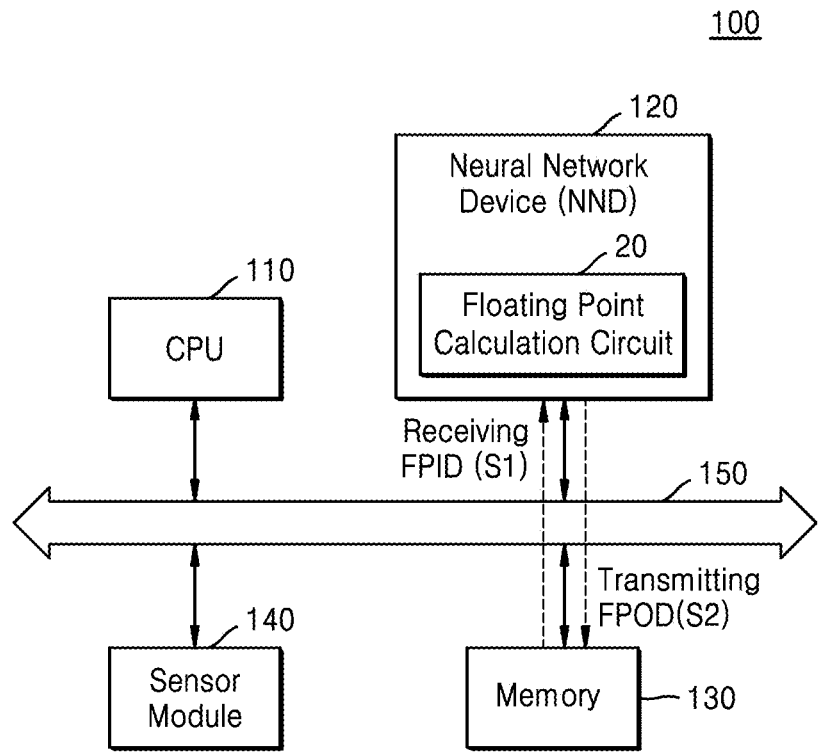
FIG. 5 is a diagram showing an operation of a neural network system according some example embodiments of inventive concepts.

FIG. 5 is a diagram showing an operation of the neural network system 100 according some example embodiments of inventive concepts.

Referring to FIG. 5, the neural network device 120 may receive floating point input data (or input data) FPID from the memory 130 (operation S1). In some example embodiments, the floating point input data FPID may be transmitted from the memory 130 to the neural network device 120 through the bus 150 without an intervention of the CPU 110. For example, the neural network device 120 may include a direct memory access (DMA) controller, and the DMA controller may read the floating point input data FPID by accessing the memory 130. The neural network device 120 may perform a neural network operation including a dot-product operation for the floating point input data FPID and an accumulation operation for the floating point input data FPID by using the floating point arithmetic circuit 20. The neural network device 120 may generate floating point output data FPOD as a result of performing the neural network operation and transmit the floating point output data FPOD to the memory 150. Furthermore although FIG. 5 illustrates that the floating point arithmetic circuit 20 is a separate entity within the neural network device 120, example embodiments are not limited thereto, and the floating point arithmetic circuit 20 may correspond to separate circuitry.

As described above, the neural network device 120 according some example embodiments of inventive concepts may perform a dot-product operation and an accumulation operation quickly with relatively small power consumption.

Figure 6:
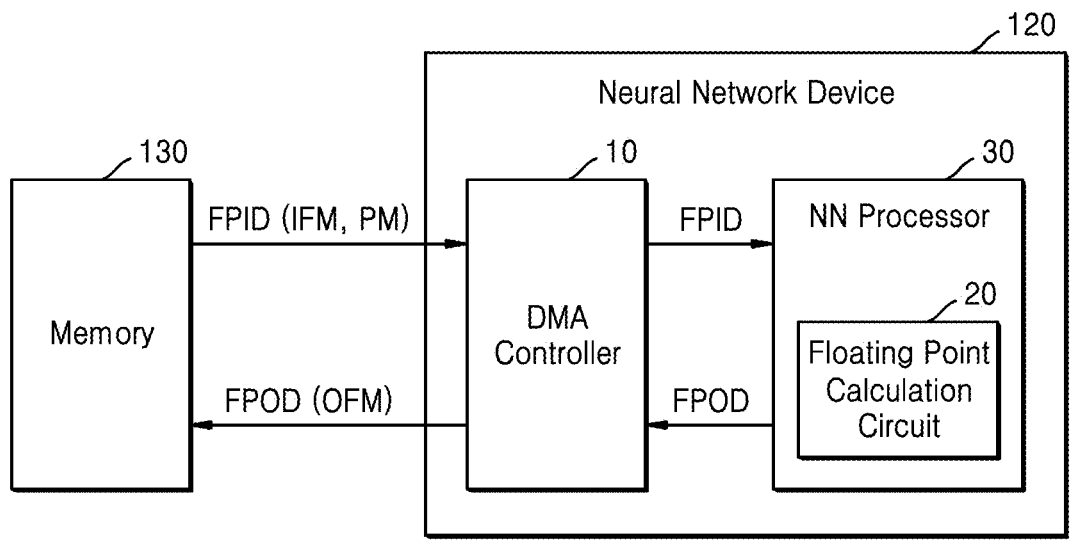
FIG. 6 is a diagram showing a neural network device according some example embodiments of inventive concepts.

FIG. 6 is a diagram showing the neural network device 120 according some example embodiments of inventive concepts. For convenience of explanation, the memory 130 is also shown.

Referring to FIG. 6, the neural network device 120 may include a DMA controller 10 and a neural network processor 30. In some example embodiments, the neural network processor 30 may include the floating point arithmetic circuit 20 capable of performing an accumulation operation and a dot-product operation according to some example embodiments of inventive concepts.

The DMA controller 10 may communicate, e.g. may directly communicate with the memory 130. The DMA controller 10 may receive input data (e.g., the floating point input data FPID) from the memory 130 and transmit the floating point output data FPOD generated as a result of a neural network operation to the memory 130, without an intervention of other processors (e.g., without intervention of any of a CPU, a GPU, etc.). For example, the floating point input data FPID may include input feature maps IFM, operation parameters PM, or weight maps WM (kernel parameter). Also, the floating point input data FPID may include quantization parameters.

The floating point arithmetic circuit 20 may perform a dot-product operation and an accumulation operation on the floating point input data FPID. The floating point arithmetic circuit 20 may perform a dot-product operation for each of the floating point data pairs classified as pairs, including data that are or had previously been mutually dot-product operated. The floating point arithmetic circuit 20 may perform a dot-product operation including an exponent part adding operation and a fraction part multiplying operation for each floating point data pairs.

In some example embodiments, the floating point arithmetic circuit 20 may collectively align-shift and sum the fraction part multiplying operation results corresponding to the respective floating point data pairs based on exponent part adding operation results on the respective floating point data pairs during a dot-product operation. In some example embodiments, the floating point arithmetic circuit 20 may determine the value, e.g. the maximum value from results of the exponent part adding operations corresponding to the respective floating point data pairs and align-shift the results of the fraction part multiplying operations in directions (e.g. left or right) and by the numbers of bits corresponding to respective differences between the results of the exponent part adding operations and the determined value/maximum value.

In some example embodiments, the floating point arithmetic circuit 20 may receive accumulated data from an internal buffer (not shown) of the neural network device 120, align-shift the fraction part of the accumulated data based on a value/maximum value determined by additionally considering an exponent value of the accumulated data, and adding the accumulated data to a result of a dot-product operation, to generate new accumulated data.

The neural network processor 30 may perform neural network operations such as at least one of convolution, pooling, etc. other than a floating point operation prior to and/or subsequent to an operation of the floating point arithmetic circuit 20 and generate the floating point output data FPOD. For example, the floating point output data FPOD may include an output feature map OFM.

The neural network processor 30 may include a processing element array including a plurality of processing elements. Although not shown, the neural network processor 30 may include an internal buffer for storing neural network parameters like bias values, weight values, input features, and output features and a controller. The processing elements may constitute the floating point arithmetic circuit 20, and the neural network processor 30 may perform a neural network operation including a floating point operation according to example embodiments of inventive concepts. Furthermore although FIG. 6 illustrates that the floating point arithmetic circuit 20 is a separate entity within the neural network processor 30, example embodiments are not limited thereto, and the floating point arithmetic circuit 20 may correspond to separate circuitry.

Hereinafter, the configuration and the operation of the floating point arithmetic circuit 20 will be described.

Figure 7A:
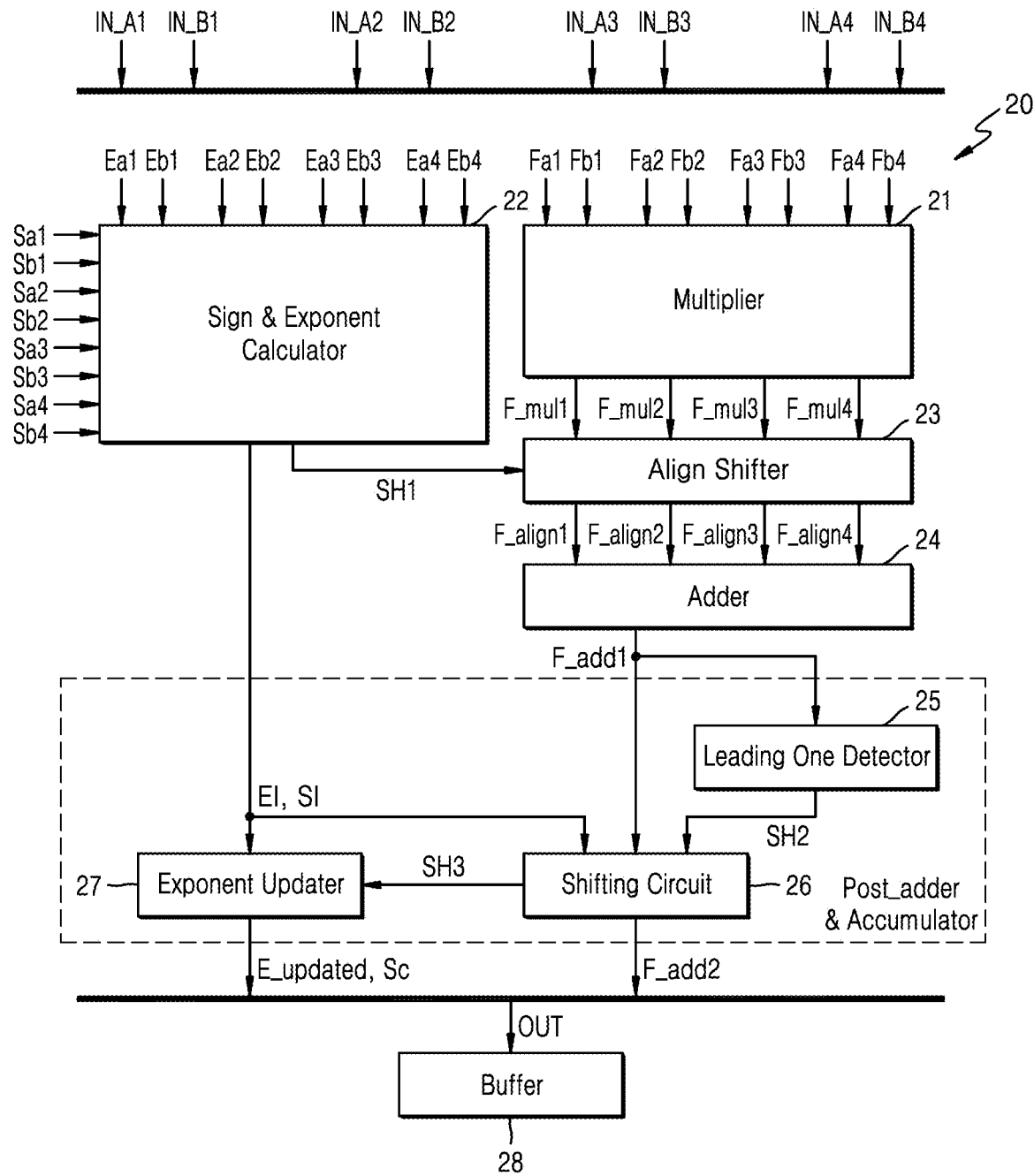
FIG. 7A is a diagram showing a floating point arithmetic circuit performing a dot-product operation according some example embodiments of inventive concepts.

FIG. 7A is a diagram showing the floating point arithmetic circuit 20 performing a dot-product operation according some example embodiments of inventive concepts, and FIG. 7B is a diagram for describing types of formats of floating point data pairs P1, P2, and P3 input to the floating point arithmetic circuit 20.

Referring to FIG. 7A, the floating point arithmetic circuit 20 may include a multiplier (or a floating point multiplier) 21, a sign and exponent calculator 22, an align-shifter 23, an adder 24, a leading one detector (LOD) 25, a shifting circuit 26, an exponent updater 27, and a buffer 28. In an example embodiment, the LOD 25, the shifting circuit 26, and the exponent updater 27 may constitute a post adder and an accumulator.

The floating point arithmetic circuit 20 may perform dot-product operations on first to fourth floating point data pairs input thereto. A first floating point data pair may include first and second floating point data IN_A1 and IN_B1, a second floating point data pair may include third and fourth floating point data IN_A2 and IN_B2, a third floating point data pair may include fifth and sixth floating point data IN_A3 and IN_B3, and a fourth floating point data pair may include seventh and eighth floating point data IN_A4 and IN_B4. Signs Sa1, Sb1, Sa2, Sb2, Sa3, Sb3, Sa4, and Sb4 and exponent parts Ea1, Eb1, Ea2, Eb2, Ea3, Eb3, Ea4, and Eb4 of the first to eighth floating point data IN_A1, IN_B1, IN_A2, IN_B2, IN_A3, IN_B3, IN_A4, and IN_B4 may be input to the sign and exponent calculator 22, and fraction parts Fa1, Fb1, Fa2, Fb2, Fa3, Fb3, Fa4, and Fb4 may be input to the multiplier 21.

The multiplier 21 may generate first to fourth fraction part multiplying operation results F_mul1, F_mul2, F_mul3, and F_mul4 by performing multiplying operations on the fraction parts Fa1, Fb1, Fa2, Fb2, Fa3, Fb3, Fa4, and Fb4, and may provide the first to fourth fraction part multiplying operation results F_mul1, F_mul2, F_mul3, and F_mul4 to the align-shifter 23. Meanwhile, in some example embodiments, the multiplier 21 may be implemented as an 11-bit multiplier. Alternatively or additionally, the multiplier 21 may be implemented as a 24 or 32-bit multiplier having an extended number of bits.

The sign and exponent calculator 22 may determine a sign based on the signs Sa1, Sb1, Sa2, Sb2, Sa3, Sb3, Sa4, and Sb4 and the exponent parts Ea1, Eb1, Ea2, Eb2, Ea3, Eb3, Ea4, and Eb4 and perform an exponent part adding operation.

In some example embodiments, the sign and exponent calculator 22 may generate first shifting information SH1 to be provided to the align-shifter 23 based on a maximum value from exponent part adding operation results. The first shifting information SH1 may include information regarding shifting directions and shifting amounts respectively corresponding to the first to fourth fraction part multiplying operation results F_mul1, F_mul2, F_mul3, and F_mul4 provided from the multiplier 21. In detail, the sign and exponent calculator 22 may generate the first shifting information SH1 for align-shifting each of the first to fourth fraction part multiplying operation results F_mul1, F_mul2, F_mul3, and F_mul4 by directions and the numbers of bits respectively corresponding to differences between a plurality of exponent part adding operation results and the maximum value.

The align-shifter 23 may generate first to fourth aligned fraction part multiplying operation results F_align1, F_align2, F_align3, and F_align4 by align-shifting the first to fourth fraction part multiplying operation results F_mul1, F_mul2, F_mul3, and F_mul4 based on the first shifting information SH1, and may provide the first to fourth aligned fraction part multiplying operation results F_align1, F_align2, F_align3, and F_align4 to the adder 24.

In some example embodiments, the adder 24 may generate first sum data F_add1 by collectively summing the first to fourth aligned fraction part multiplying operation results F_align1, F_align2, F_align3, and F_align4.

The LOD 25 may receive the first sum data F_add1, and may detect a position of a preceding '1' in the first sum data F_add1. The LOD 25 may generate second shifting information SH2, such that the preceding '1' for post-normalizing the first sum data F_add1 becomes the MSB of the fraction part of second sum data F_add2.

In some example embodiments, the shifting circuit 26 may determine whether to round the first sum data F_add1 and perform rounding based on a result of the determination. The shifting circuit 26 may determine an amount and a direction for shifting based on the second shifting information SH2 received from the LOD 25, whether the first sum data F_add1 is rounded, and exponent information EI and sign information SI provided from the sign and exponent calculator 22. In some example embodiments, the exponent information EI may include information regarding a maximum value in the exponent part adding operation results. The shifting circuit 26 may normalize the first sum data F_add1 by shifting the first sum data F_add1 by the determined amount and in the determined direction (e.g. left or right shift). The shifting circuit 26 may generate second sum data F_add2 by rounding and normalizing the first sum data F_add1.

As above, the configuration of the adder 23 that collectively sums the first to fourth fraction part multiplying operation results F_mul1, F_mul2, F_mul3, and F_mul4 and the shifting circuit 26 that rounds the first sum data F_add1 at once may minimize latency in a dot-product operation and further increase accuracy by reducing the number of roundings, thereby improving the speed of the dot-product operation.

The exponent updater 27 may update the exponent of the second sum data F_add2 based on the exponent information EI and the sign information SI provided from the sign and exponent calculator 22 and third shifting information SH3 provided from the shifting circuit 26 and output an updated exponent E_updated and a sign Sc of the second sum data F_add2.

The floating point arithmetic circuit 20 may generate output data OUT by reflecting the updated exponent E_updated and the updated sign Sc in the second sum data F_add2 and store the output data OUTPUT in the buffer 28.

Referring now to FIG. 7B, in a first case Case1, the floating point arithmetic circuit 20 may input the first and second floating point data IN_A and IN_B a dot-product operation, while first and second floating point data IN_A and IN_B have the same format. Sign bit regions Sa and Sb, exponent part bit regions Ea and Eb, and fraction part bit regions Fa and Fb of the first and second floating point data IN_A and IN_B may have the same widths (e.g. the same number of consecutive bits). For example, the first and second floating point data IN_A and IN_B may have a FP16 type format.

In a second case Case2, the floating point arithmetic circuit 20 may input the first and second floating point data IN_A and IN_B having different formats for a dot-product operation. The sign bit regions Sa and Sb, the exponent part bit regions Ea and Eb, and the fraction part bit regions Fa and Fb of the first and second floating point data IN_A and IN_B may have different widths (e.g. a different number of consecutive bits). For example, the first and second floating point data IN_A and IN_B may have the FP16 type format and a BF16 type format, respectively.

In a third case Case3, the floating point arithmetic circuit 20 may input the first and second floating point data IN_A and IN_B having the same format for a dot-product operation. The sign bit regions Sa and Sb, the exponent part bit regions Ea and Eb, and the fraction part bit regions Fa and Fb of the first and second floating point data IN_A and IN_B may have the same widths (e.g. the same number of consecutive bits). For example, the first and second floating point data IN_A and IN_B may have the BF16 type format.

Meanwhile, the descriptions of the floating point arithmetic circuit 20 given above with reference to FIGS. 7A and 7B are merely example embodiments, and inventive concepts are not limited thereto. The floating point arithmetic circuit 20 may be implemented in various examples to which inventive concepts may be applied, may receive floating point data having formats of various types, and may perform dot-product operations thereon.

Figure 8A:
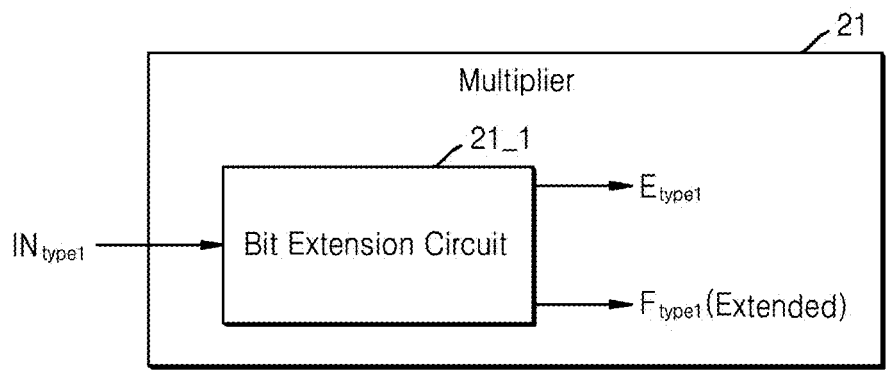
FIGS. 8A and 8B are diagrams for describing a multiplier that performs bit extension according to a type of a format of floating point data.
Figure 8B:
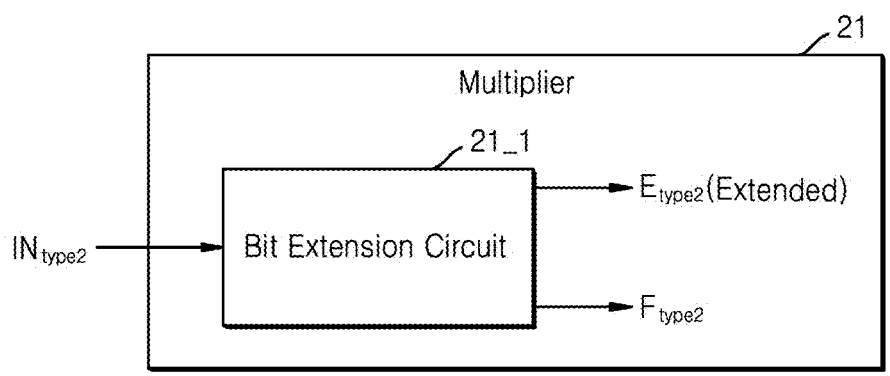

FIGS. 8A and 8B are diagrams for describing the multiplier 21 that performs bit extension according to a type of a format of floating point data.

Referring to FIG. 8A, the multiplier 21 may include a bit extension circuit 21_1. In some example embodiments, the bit extension circuit 21_1 may extend (lengthen) at least one of an exponent part bit region and a fraction part bit region included in floating point data according to a type of the format of the floating point data. For example, the bit extension circuit 21_1 may receive first type floating point data $IN_{type1}$, output an exponent part $E_{type1}$ of the first type floating point data $IN_{type1}$ as it is, and extend a bit region of a fraction part $F_{type1}$ to a specific (or, alternatively, predetermined) first bit width. The first bit width may be related to at least one of a bit width of a fraction part $F_{type2}$ of second type floating point data $IN_{type2}$, a bit width of the multiplier 21 of FIG. 7A, the number of bits of output data of a floating point arithmetic circuit, and a type of the format of the output data.

Referring to FIG. 8B, the bit extension circuit 21_1 may receive the second type floating point data $IN_{type2}$, extend a bit region of an exponent part $E_{type2}$ of the second type floating point data $IN_{type2}$ to a specific (or, alternatively, predetermined) second bit width, and output a fraction part $F_{type2}$ as it is. The second bit width may be related to the bit width of the exponent part $E_{type1}$ of the first type floating point data $IN_{type1}$.

As a non-limiting example, when a first type is BF16 and a second type is FP16, it may be determined or predetermined that the first bit width is 11 bits (the sum of 10 bits, which is the bit width of the fraction part $F_{type2}$ of FP16 and 1 bit) according to the bit width of the fraction part $F_{type2}$ of FP16. In other words, the fraction part $F_{type1}$ of the first type floating point data $IN_{type1}$ having the BF16 format may be extended or expanded to match the bit width of the fraction part $F_{type2}$ of the second type floating point data $IN_{type2}$ having the format of FP16, and then a multiplying operation may be performed.

Also, as a non-limiting example, the second bit width may be determined or predetermined to be 8 bits according to the bit width of the exponent part $E_{type1}$ of BF16. In other words, the fraction part $F_{type2}$ of the second floating point data $IN_{type2}$ having the FP16 format may be extended or expanded to match the bit width of the exponent part $E_{type1}$ of the first type floating point data $IN_{type1}$ having the format of BF16, and then an adding operation may be performed.

Figure 9:
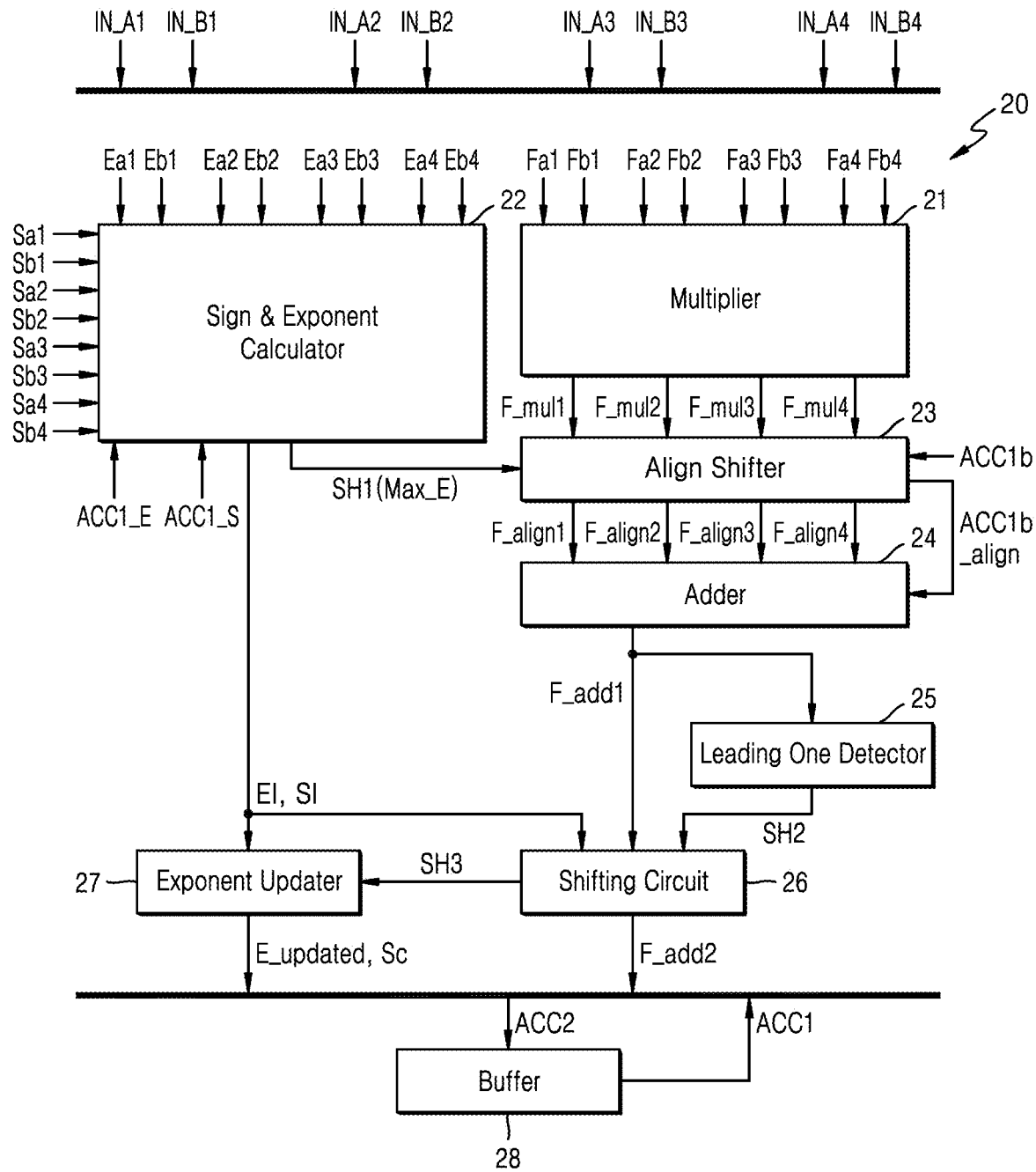
FIG. 9 is a diagram showing a floating point arithmetic circuit performing an accumulation operation according some example embodiments of inventive concepts.

FIG. 9 is a diagram showing a floating point arithmetic circuit 20 performing an accumulation operation according some example embodiments of inventive concepts. Hereinafter, descriptions identical to those given above with reference to FIG. 7A will be omitted, and descriptions below will be given focusing on an accumulation operation for generating second accumulated data ACC2 from first accumulated data ACC1.

Referring to FIG. 9, the floating point arithmetic circuit 20 may receive the first accumulated data ACC1 from the buffer 28. A sign ACC1_S and an exponent part ACC1_E of the first accumulated data ACC1 may be input to the sign and exponent calculator 22, and a fraction part ACC1b may be input to the align-shifter 23.

The sign and exponent calculator 22 according some example embodiments may determine the value, e.g. the maximum value from the exponent part adding operation results and the exponent part ACC1_E of the first accumulated data ACC1 and generate first shifting information SH1 to be provided to the align-shifter 23 based on the determined value. The first shifting information SH1 may include information regarding shifting directions and shifting amounts respectively corresponding to first to fourth fraction part multiplying operation results F_mul1, F_mul2, F_mul3, and F_mul4 and the fraction part ACC1b of the first accumulated data ACC1. In detail, the sign and exponent calculator 22 may generate the first shifting information SH1 for align-shifting the first to fourth fraction part multiplying operation results F_mul1, F_mul2, F_mul3, and F_mul4 and the fraction part ACC1b of the first accumulated data ACC1 in directions and by bit numbers corresponding to respective differences between a plurality of exponent part adding operation results and the fraction part ACC1b of the first accumulated data ACC1 and the maximum value.

The align-shifter 23 may generate first to fourth aligned fraction part multiplying operation results F_align1, F_align2, F_align3, and F_align4 and an aligned fraction part ACC1b_align by align-shifting the first to fourth fraction part multiplying operation results F_mul1, F_mul2, F_mul3, and F_mul4 and the fraction part ACC1b of the first accumulated data ACC1 based on the first shifting information SH1 and provide the first to fourth aligned fraction part multiplying operation results F_align1, F_align2, F_align3, and F_align4 and the aligned fraction part ACC1b_align to the adder 24.

In some example embodiments, the adder 24 may generate first sum data F_add1 by summing the first to fourth aligned fraction part multiplying operation results F_align1, F_align2, F_align3, and F_align4 and the aligned fraction part ACC1b_align.

Thereafter, the floating point arithmetic circuit 20 may generate the second accumulated data ACC2 from the first sum data F_add1 by using the LOD 25, the shifting circuit 26, and the exponent updater 27 and output the second accumulated data ACC2 to the buffer 28. The first accumulated data ACC1 stored in the buffer 28 may be updated to the second accumulated data ACC2.

In this way, the floating point arithmetic circuit 20 may perform an accumulation operation by performing a dot-product operation on newly received floating point data and adding a result of new dot-product operation to accumulated data stored in the buffer 28.

The adder 24 according some example embodiments may be used for both a floating point operation and an integer operation, and thus, the size of the floating point arithmetic circuit 20 may be effectively reduced.

Figure 10:
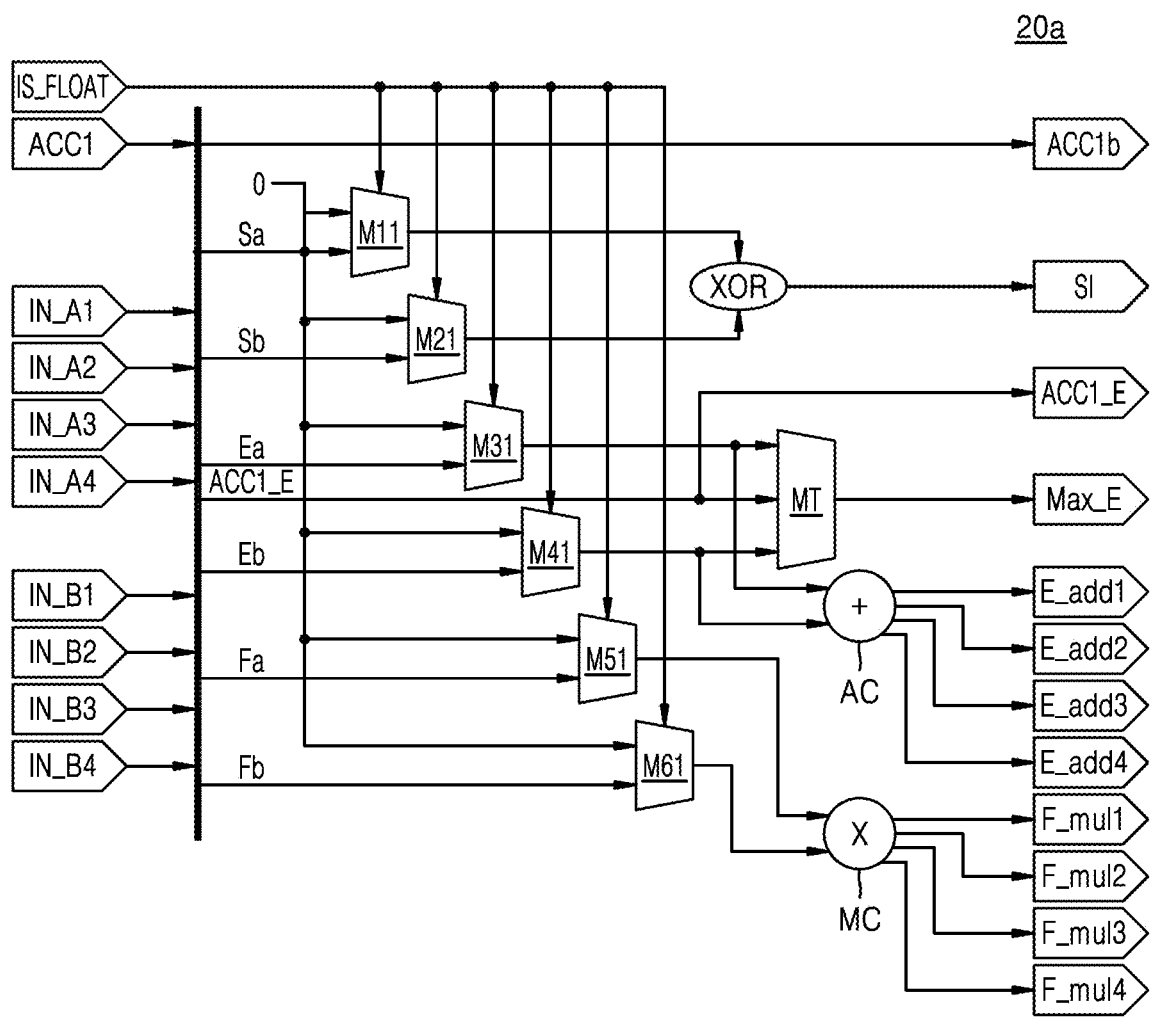
FIGS. 10 and 11 are diagrams for describing operations of floating point arithmetic circuits according some example embodiments of inventive concepts.
Figure 11:
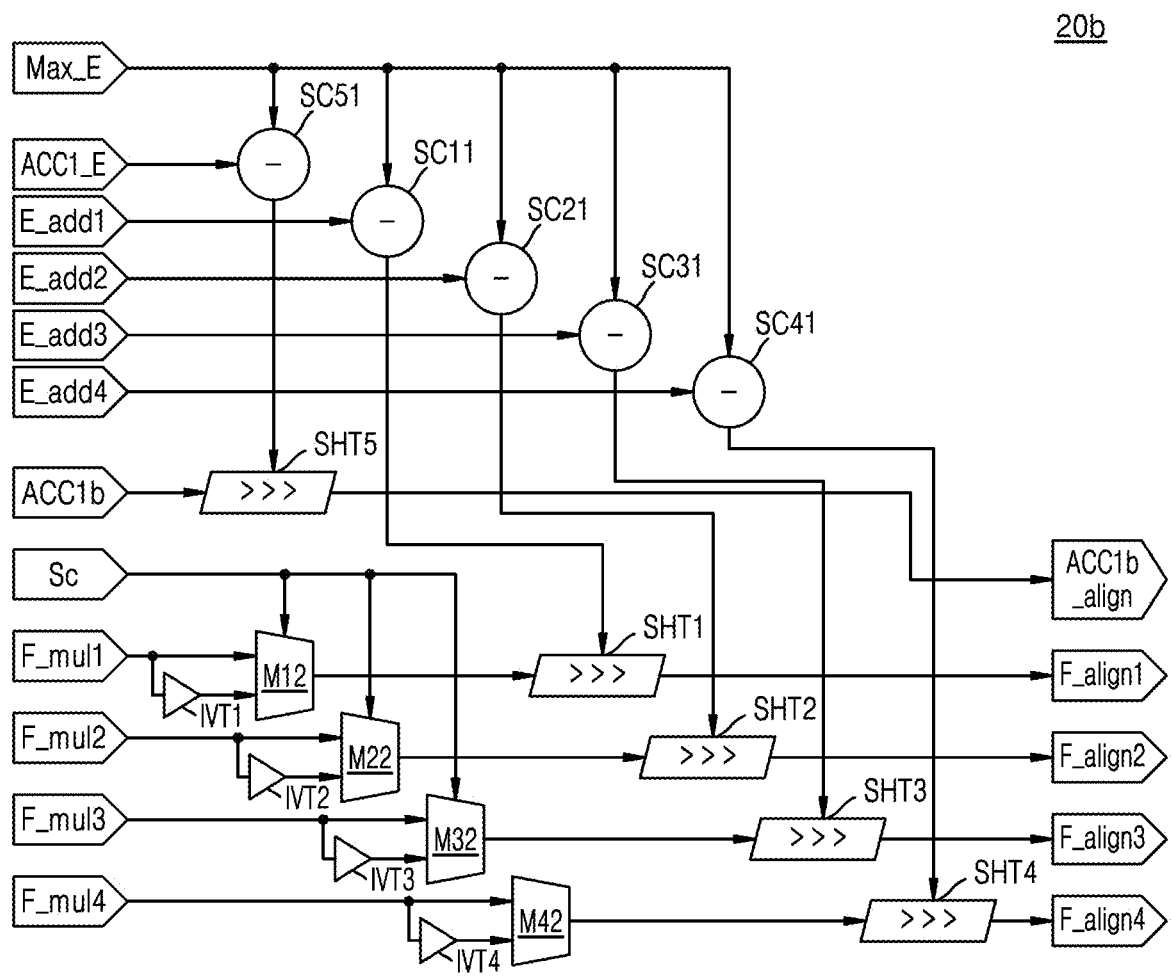

FIGS. 10 and 11 are diagrams for describing operations of floating point arithmetic circuits 20a and 20b according some example embodiments of inventive concepts.

Referring to FIG. 10, the floating point arithmetic circuit 20a may include a first to sixth multiplexers M11 to M61, an XOR circuit XOR, a max tree circuit MT, an adding circuit AC, and a multiplying circuit MC.

The first to sixth multiplexers M11 to M61 may output '0' in response to a signal 'IS_FLOAT' when the floating point arithmetic circuit 20a is operated in an integer operation mode. Components for a floating point operation in the floating point arithmetic circuit 20a may be deactivated due to '0' output by the first to sixth multiplexers M11 to M61. Hereinafter, descriptions will be given by focusing on the floating point arithmetic circuit 20a operating in a floating point operation mode.

The floating point arithmetic circuit 20a may receive the first to eighth floating point data IN_A1, IN_B1, IN_A2, IN_B2, IN_A3, IN_B3, IN_A4, and IN_B4 and accumulated data ACC1. A first multiplexer M11 may sequentially output signs Sa of first, third, fifth, and seventh floating point data IN_A1, IN_A2, IN_A3, and IN_A4 to the XOR circuit XOR. A second multiplexer M21 may sequentially output signs Sb of second, fourth, sixth, and eighth floating point data IN_B1, IN_B2, IN_B3, and IN_B4 to the XOR circuit XOR. The XOR circuit XOR may generate the sign information SI by performing an XOR operation on received signs Sa and Sb.

A third multiplexer M31 may sequentially output first exponent parts Ea of the first, third, fifth, and seventh floating point data IN_A1, IN_A2, IN_A3, and IN_A4 to each of the max tree circuit MT and the adding circuit AC, respectively. A fourth multiplexer M41 may sequentially output second exponent parts Eb of the second, fourth, sixth, and eighth floating point data IN_B1, IN_B2, IN_B3, and IN_B4 to each of the max tree circuit MT and the adding circuit AC, respectively.

The max tree circuit MT may receive a third exponent part ACC1_E of the accumulated data ACC1, the first exponent parts Ea, and the second exponent part Eb and determine and output a value such as a maximum value Max_E for align-shifting. In some example embodiments, the max tree circuit MT may perform an adding operation between the exponent parts respectively corresponding to the first exponent part Ea and the second exponent part Eb, compare a plurality of exponent part adding operation results to a value of the third exponent part ACC1_E with one another, and output a largest exponent value as the maximum value Max_E.

The adding circuit AC may output first to fourth exponent part adding operation results E_add1 to E_add4 by performing adding operations between exponent parts respectively corresponding to the first exponent part Ea and the second exponent part Eb.

A fifth multiplexer M51 may sequentially output first fraction parts Fa of the first, third, fifth and seventh floating point data IN_A1, IN_A2, IN_A3, and IN_A4 to the multiplying circuit MC. The sixth multiplexer M61 may sequentially output second fraction parts Fb of the second, fourth, sixth, and eighth floating point data IN_B1, IN_B2, IN_B3, and IN_B4 to the multiplying circuit MC.

The multiplying circuit MC may output first to fourth fraction part multiplying operation results F_mul1 to F_mul4 by performing multiplying operations between fraction parts respectively corresponding to the first fraction part Fa and the second fraction part Fb.

With further reference to FIG. 11, the floating point arithmetic circuit 20b may include first to fourth inverters IVT1 to IVT4, seventh to tenth multiplexers M12 to M42, first to fifth shifting circuits SHT1 to SHT5, and first to fifth subtracting circuits SC1 to SC5.

The seventh multiplexer M12 may receive a first fraction part multiplying operation result F_mul1 and an inverted first fraction part multiplying operation result inverted by the first inverter IVT1. The eighth multiplexer M22 may receive a second fraction part multiplying operation result F_mul2 and an inverted second fraction part multiplying operation result inverted by the second inverter IVT2. The ninth multiplexer M32 may receive a third fraction part multiplying operation result F_mul3 and an inverted third fraction part multiplying operation result inverted by the third inverter IVT3. The tenth multiplexer M42 may receive a fourth fraction part multiplying operation result F_mul4 and an inverted fourth fraction part multiplying operation result inverted by the fourth inverter IVT4.

The seventh to tenth multiplexers M12 to M42 may each output a non-inverted fraction part multiplying operation result or an inverted fraction part multiplying operation result in response to a corresponding sign from the sign information SI. For example, the seventh multiplexer M12 may output the first fraction part multiplying operation result F_mul1 as it is when the first fraction part multiplying operation result F_mul1 is a positive number and may output the inverted first fraction part multiplying operation result when the first fraction part multiplying operation result F_mul1 is a negative number.

The first subtracting circuit SC1 may perform a subtracting operation for the value, e.g. the maximum value Max_E and a first exponent part adding operation result E_add1 and provide a result of the subtracting operation to the first shifting circuit SHT1. The first shifting circuit SHT1 may output a first aligned fraction part multiplying operation result F_align1 by shifting an output from the seventh multiplexer M12 in a direction and by the number of bits corresponding to a difference between the maximum value Max_E and the first exponent part adding operation result E_add1.

The second subtracting circuit SC2 may perform a subtracting operation for the maximum value Max_E and a second exponent part adding operation result E_add2 and provide a result of the subtracting operation to the second shifting circuit SHT2. The second shifting circuit SHT2 may output a second aligned fraction part multiplying operation result F_align2 by shifting an output from the eighth multiplexer M22 in a direction and by the number of bits corresponding to a difference between the maximum value Max_E and the second exponent part adding operation result E_add2.

The third subtracting circuit SC3 may perform a subtracting operation for the maximum value Max_E and a third exponent part adding operation result E_add3 and provide a result of the subtracting operation to the third shifting circuit SHT3. The third shifting circuit SHT3 may output a third aligned fraction part multiplying operation result F_align3 by shifting an output from the ninth multiplexer M32 in a direction and by the number of bits corresponding to a difference between the maximum value Max_E and the third exponent part adding operation result E_add3.

The fourth subtracting circuit SC4 may perform a subtracting operation for the maximum value Max_E and a fourth exponent part adding operation result E_add4 and provide a result of the subtracting operation to the fourth shifting circuit SHT4. The fourth shifting circuit SHT4 may output a fourth aligned fraction part multiplying operation result F_align4 by shifting an output from the tenth multiplexer M42 in a direction and by the number of bits corresponding to a difference between the maximum value Max_E and the fourth exponent part adding operation result E_add4.

The fifth subtracting circuit SC5 may perform a subtracting operation for the maximum value Max_E and the third exponent part ACC1_E of the accumulated data ACC1 and provide a result of the subtracting operation to the fifth shifting circuit SHT5. The fifth shifting circuit SHT5 may output an aligned fraction part ACC1b_align by shifting the fraction part ACC1b of the accumulated data ACC1 in a direction and by the number of bits corresponding to a difference between the maximum value Max_E and the third exponent part ACC1_E.

Thereafter, the first to fourth aligned fraction part operation results F_align1 to F_align4 and the aligned fraction part ACC1b_align of accumulated data ACC1 may be collectively summed. Thereafter, the floating point arithmetic circuit 20b may generate output data by performing operations like normalization and rounding on a result of the collective summation and output the output data.

In some example embodiments, the maximum shifting amount of the first to fifth shifting circuits SH1 to SHT5 may be limited without compromising an operation accuracy demanded by a neural network device, thereby reducing the size and the power consumption of the floating point arithmetic circuit 20b.

Figure 12:
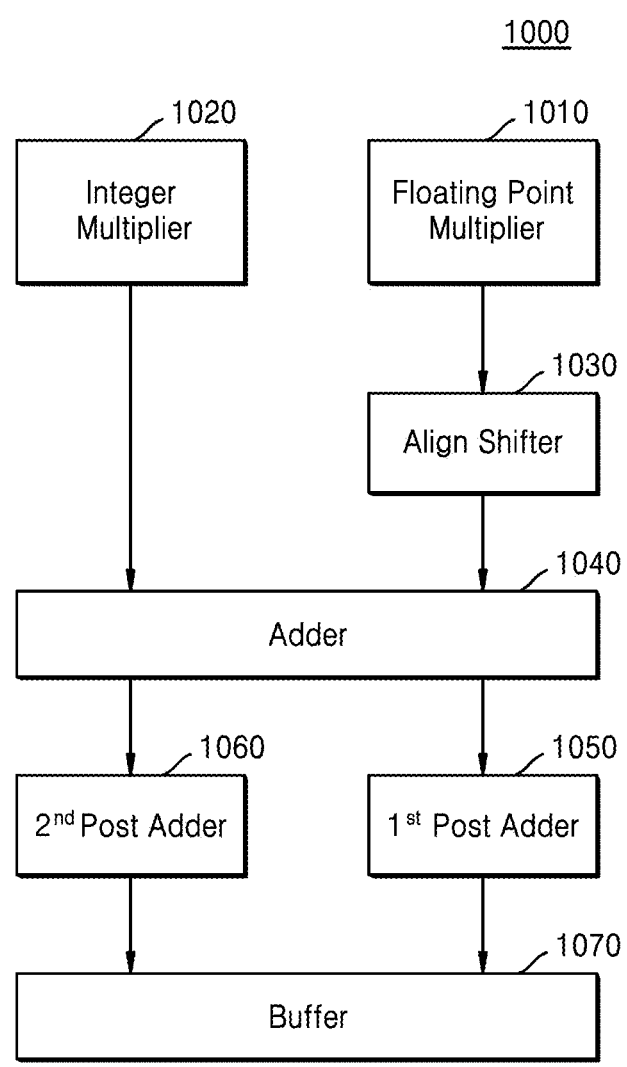
FIG. 12 is a block diagram showing an operation circuit included in a neural network device according some example embodiments of inventive concepts.

FIG. 12 is a block diagram showing an operation circuit 1000 included in a neural network device according some example embodiments of inventive concepts.

Referring to FIG. 12, the operation circuit 1000 may include a floating point multiplier 1010, an integer multiplier 1020, an align-shifter 1030, an adder 1040, a first post adder 1050, a second post adder 1060, and a buffer 1070. Other than the components shown in FIG. 13, the operation circuit 1000 may further include a plurality of components to perform various neural network operations.

In some example embodiments, the operation circuit 1000 may perform a dot-product operation and an accumulation operation for floating point data and perform a dot-product operation for integer data. The adder 1040 may be shared by the floating point multiplier 1010 and the integer multiplier 1020. The adder 1040 may be used for a floating point operation when the operation circuit 1000 is in a floating point operation mode, and the adder 1040 may be used for an integer operation when the operation circuit 1000 is in an integer operation mode.

In some example embodiments, when the operation circuit 1000 is in the floating point operation mode, the adder 1040 may collectively sum aligned fraction part multiplying operation results of floating point data and provide a result of the collective summation to the first post adder 1050. The first post adder 1050 may normalize and round a received result of summation, generate first output data by reflecting an updated exponent, and store the first output data in the buffer 1070.

In some example embodiments, when the operation circuit 1000 is in the floating point operation mode, the adder 1040 may collectively sum integer part multiplying operation results of integer data and provide a result of the collective summation to the second post adder 1060. The second post adder 1060 may generate second output data based on a received result of summation and store the second output data in the buffer 1070.

Meanwhile, in some example embodiments, the first post adder 1050 and the second post adder 1060 may be integrated with each other. In some other example embodiments, the first post adder 1050 and the second post adder 1060 may be separated from each other.

Figure 13:
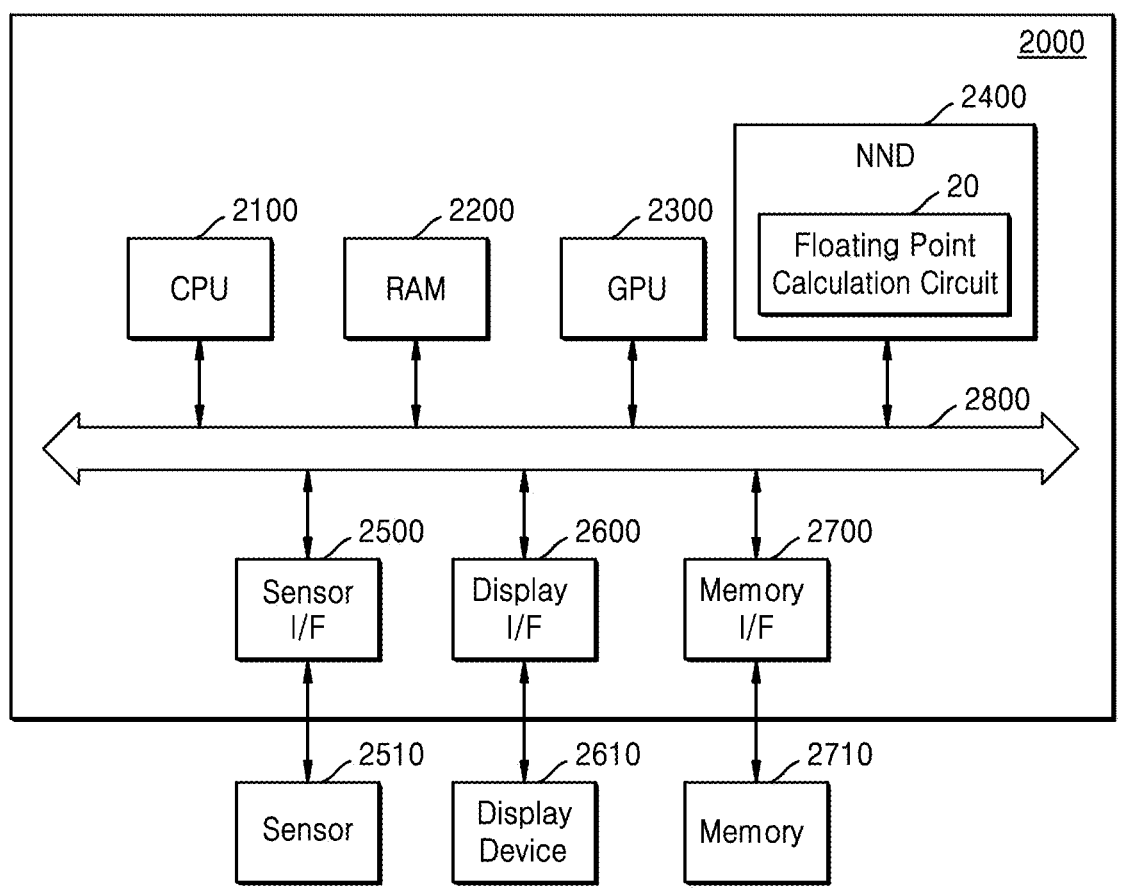
FIG. 13 is a block diagram showing an application processor according some example embodiments of inventive concepts.

FIG. 13 is a block diagram showing an application processor 2000 according some example embodiments of inventive concepts.

Referring now to FIG. 13, the application processor 2000 may include a CPU 2100, random access memory (RAM) 2200, a graphics processing unit (GPU) 2300, a neural network device 2400, a sensor interface 2500, a display interface 2600, and a memory interface 2700. Also, the application processor 2000 may further include a communication module or device, and the components of the application processor 2000 (i.e., the CPU 2100, the RAM 2200, the GPU 2300, the neural network device 2400, the sensor interface 2500, the display interface 2600, and the memory interface 2700) may transmit and/or receive data to and from one another through a bus 2800.

The CPU 2100 may control all or at least some of the operations of the application processor 2000. The CPU 2100 may include a single core or multi-cores. The CPU 2100 may process or execute programs and/or data stored in a memory 2710. In some example embodiments, the CPU 2100 may control functions of the neural network device 2400 by executing programs stored in the memory 2710.

The RAM 2200 may temporarily store programs, data, and/or instructions. According to some example embodiments, the RAM 2200 may be implemented as dynamic RAM (DRAM) and/or static RAM (SRAM). The RAM 2200 may temporarily store images that are input/output through the sensor interface 2500, the display interface 2600, and the memory interface 2700 or generated by the GPU 2300 or the CPU 2100.

The application processor 2000 may further include read-only memory (ROM). The ROM may store programs and/or data that are used continuously. The ROM may be implemented as erasable programmable ROM (EPROM) and/or electrically erasable programmable ROM (EEPROM).

The GPU 2300 may perform image processing on image data. For example, the GPU 2300 may perform image processing on image data received through the sensor interface 2500. In some example embodiments, the GPU 2300 may perform a floating point operation.

Image data processed by the GPU 2300 may be stored in the memory 2710 and/or provided to the display device 2610 through the display interface 2600. Image data stored in the memory 2710 may be provided to the neural network device 2400.

The sensor interface 2500 may interface with data (e.g., at least one of image data, audio data, etc.) input from the sensor 2510 connected to the application processor 2000.

The display interface 2600 may interface with data (e.g., images) output to the display device 2610. The display device 2610 may output images and/or image data through a display like a liquid-crystal display (LCD) and/or an active matrix organic light emitting diode (AMOLED) display.

The memory interface 2700 may interface with data input from the memory 2710 outside the application processor 2000 or data output to the memory 2710. According to some example embodiments, the memory 2710 may be implemented as at least one of a volatile memory like DRAM and/or SRAM or a non-volatile memory such as at least one of ReRAM, PRAM, or NAND flash memory. The memory 2710 may also be implemented as a memory card, e.g., at least one of an MMC card, an eMMC card, an SD card, a micro SD card, etc.

The neural network device 2400 may include the floating point arithmetic circuit 20 that performs floating point operations according to FIGS. 1 to 13. The floating point arithmetic circuit 20 may perform dot-product operations and accumulation operations for floating point data having various types of formats, and the size and the power consumption of the floating point arithmetic circuit 20 may be optimized by reducing a shiftable bit width of an align-shifter without compromising operation accuracy. The floating point arithmetic circuit 20 may determine a value such as a maximum value from exponent part adding operation results of floating point data in a dot-product operation, may collectively align and shift fraction part multiplying operation results of the floating point data based on the value, and may sum align-shifted fraction part multiplying operation results. Some detailed example embodiments of the floating point arithmetic circuit 20 are described above, and thus detailed descriptions thereof will be omitted below.

Any or all of the elements disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

Some example embodiments have been described with reference to a neural network device such as a deep neural network device; however, example embodiments are not limited thereto. For example, some example embodiments may be directed to other application-specific integrated circuits that perform many floating point arithmetic operations, such as, but not limited to, at least one of graphics processing units, ASIC's used in mainframes such as vector processing circuits, certain ASIC's used in cryptocurrency mining, for example for proof-of-work processes such as hash processes, etc.

While inventive concepts has been particularly shown and described with reference to some example embodiments thereof, it will be understood that various changes in form and details may be made therein without departing from the spirit and scope of the following claims.

What is claimed is:

1. A neural network device configured to perform a neural network operation, the neural network device comprising:
processing circuitry configured to perform a dot-product operation for each of a plurality of floating point data pairs, one of the floating point data pair having a different format than the other of the floating point data pair,
the processing circuitry including a bit extension circuit configured to extend at least one of an exponent part bit region and a fraction part bit region of at least one of the floating point data pair according to its respective format, wherein the processing circuitry is configured to perform the dot-product operation by multiplexing, by a plurality of multiplexers included in the processing circuitry, the plurality of floating point data pairs, and align-shifting, by a plurality of shifters included in the processing circuitry, a plurality of fraction part multiplying operation results respectively corresponding to the floating point data pairs, the align-shifting based on a first value determined from a plurality of exponent part adding operation results respectively corresponding to the floating point data pairs.

2. The neural network device of claim 1, wherein the floating point data pairs include a plurality of pieces of input data, the plurality of pieces of input data having a format of at least one of a Floating Point 16 (FP16) type or a Brain Float 16 (BF16) type.

3. The neural network device of claim 2, wherein processing circuitry is configured to output output data, the output data having a format of a Floating Point 32 (FP32) type.

4. The neural network device of claim 2, wherein the bit extension circuit is configured to extend a bit region of an exponent part of first data having the format of an FP 16 type from among the input data and to extend a bit region of a fraction part of second data having the format of a BF 16 type from among the input data.

5. The neural network device of claim 4, wherein the bit extension circuit is configured to extend the bit region of the exponent part of the first data to match a bit region width of an exponent part of the second data.

6. The neural network device of claim 4, wherein the bit extension circuit is configured to extend the bit region of the fraction part of the second data to match a bit region width of a fraction part of the first data.

7. The neural network device of claim 1, wherein the processing circuitry is configured to, in the align-shifting, extend or discard fraction part multiplying operation results, the extending or discarding based on a bit width that is variable according to an operation accuracy of an application, the application using data generated by the neural network device.

8. The neural network device of claim 1, wherein the processing circuitry is configured to
perform a multiplying operation on each of a plurality of integer data pairs, and
sum the align-shifted fraction part multiplying operation results.

9. The neural network device of claim 1, further comprising:
a buffer, wherein
the processing circuitry is configured to generate second accumulated data by align-shifting and summing a plurality of fraction part multiplying operation results corresponding to the floating point data pairs and a fraction part of first accumulated data received from the buffer, the generating the second accumulated data based on the first value determined by additionally considering an exponent value of the first accumulated data.

10. The neural network device of claim 1, wherein the processing circuitry is configured to generate output data by (A) summing align-shifted fraction part multiplying operation results and (B) normalizing and rounding a result of the summation.

11. The neural network device of claim 10, wherein the output data has a format different from that of a plurality of pieces of input data included in the floating point data pairs.

12. The neural network device of claim 1, wherein the processing circuitry is configured to align-shift the fraction part multiplying operation results (A) in directions and (B) by a number of bits respectively corresponding to differences between the exponent part adding operation results and the first value.

13. A method of operating a neural network device, the method comprising:
receiving a plurality of floating point data pairs from a memory, one half of a floating point data pair from among the plurality of floating point data pairs having a different format than the other half of the floating point data pair from among the plurality of floating point data pairs; and
performing a dot-product operation for each of the plurality of floating point data pairs, the dot-product operation including extending, by a bit extension circuit included in the neural network device, at least one of an exponent part bit region and a fraction part bit region of at least one half of a floating point data pair according to its respective format, and multiplexing the plurality of floating point data pairs by a plurality of multiplexers included in the neural network device,
wherein the performing of the dot-product operation includes,
performing exponent part adding operations for each of the plurality of floating point data pairs,
performing fraction part multiplying operations on the each of the plurality of floating point data pairs,
determining a first value from the exponent part adding operation results respectively corresponding to the each of the plurality of floating point data pairs, and
align-shifting, by a plurality of shifters included in the neural network device, the fraction part multiplying operation results respectively corresponding to the each of the plurality of floating point data pairs based on the first value.

14. The method of claim 13, wherein the align-shifting comprises:
align-shifting the fraction part multiplying operation results (A) in directions corresponding to differences between the exponent part adding operation results and the first value and (B) by a number of bits respectively corresponding to the differences between the exponent part adding operation results and the first value.

15. The method of claim 13, wherein the performing of the dot-product operation comprises:
generating a first sum result by summing the align-shifted fraction part multiplying operation results;
generating a second sum result by normalizing the first sum result and by rounding the first sum result; and
generating output data from the second sum result based on the first value.

16. The method of claim 15, wherein the output data has a first format different from a second format of a plurality of pieces of input data included in the floating point data pairs.

17. An application processor comprising:
a neural network device configured to perform a dot-product operation for each of a plurality of floating point data pairs, the floating point data pairs including operation parameters and feature values, one half of a floating point data pair from among the plurality of floating point data pairs having a different format than the other half of the floating point data pair from among the plurality of floating point data pairs, wherein the neural network device is configured to perform the dot-product operation including extending, by a bit extension circuit included in the neural network device, at least one of an exponent part bit region and a fraction part bit region of at least one half of a floating point data pair according to its respective format, and multiplexing the plurality of floating point data pairs by a plurality of multiplexers included in the neural network device, wherein the performing of the dot-product operation includes collectively align-shifting, by a plurality of shifters included in the neural network device, and summing a plurality of fraction part multiplying operation results corresponding to the floating point data pairs, the align-shifting and summing based on a plurality of exponent part adding operation results respectively corresponding to the floating point data pairs.

18. The application processor of claim 17, wherein the neural network device is configured to align-shift the fraction part multiplying operations results (A) in directions corresponding to differences between a first value of the exponent part adding operation results and the exponent part adding operation results and (B) by a number of bits respectively corresponding to differences between a first value of the exponent part adding operation results and the exponent part adding operation results.

19. The application processor of claim 17, wherein the neural network device is configured to generate output data by summing align-shifted fraction part multiplying operation results, by normalizing a result of the summation, and by rounding the result of the summation.

20. The application processor of claim 17, wherein a first type of a format of input data input to the neural network device is different from a second type of a format of output data output from the neural network device.

* * * * *